United States Patent [19]

Markos

[11] Patent Number: 4,852,298
[45] Date of Patent: Aug. 1, 1989

[54] PORTABLE COLD FRAME

[76] Inventor: Peter Markos, 5440 N. Braeswood #1002, Houston, Tex. 77096-3201

[21] Appl. No.: 158,638

[22] Filed: Feb. 22, 1988

[51] Int. Cl.$^4$ ............................ A01G 9/16; A01G 9/24
[52] U.S. Cl. ............................................ 47/17; 47/29; 47/28.1
[58] Field of Search .................... 47/17, 18, 19, 66, 69, 47/26, 28 R, 29, 2, 20, 21; 135/97

[56] References Cited

U.S. PATENT DOCUMENTS

| | | | |
|---|---|---|---|
| 2,626,483 | 1/1953 | Service | 47/29 X |
| 3,946,521 | 3/1976 | Ours | 47/19 X |
| 4,160,340 | 7/1979 | Levett | 47/27 |
| 4,429,489 | 2/1984 | Fischer | 47/19 X |
| 4,768,307 | 9/1988 | Holowecky | 47/29 |

FOREIGN PATENT DOCUMENTS

| | | | |
|---|---|---|---|
| 1066985 | 11/1979 | Canada | 47/29 |
| 2242893 | 3/1974 | Fed. Rep. of Germany | 47/29 |
| 2590762 | 6/1987 | France | 47/29 |

Primary Examiner—Robert A. Hafer
Assistant Examiner—Kevin G. Rooney
Attorney, Agent, or Firm—Dennison, Meserole, Pollack & Scheiner

[57] ABSTRACT

A cold frame comprising a housing formed of one or more housing sections with opposed ends walls. The sections include channel-defining end edges interlockable with the end edges of adjacent sections and with the end walls. The sections at the joinders therebetween, forming outwardly directed channels for water exclusion. The sections include, along the opposed side walls thereof, elongate vents with connector bars between the aligned vents of adjacent sections for a gang operation of all of the vents along a side of the cold frame. Each section and end wall incldues positioning blocks mounted thereon for the reception of horizontal alignment pins therethrough and vertical anchoring stakes.

12 Claims, 2 Drawing Sheets

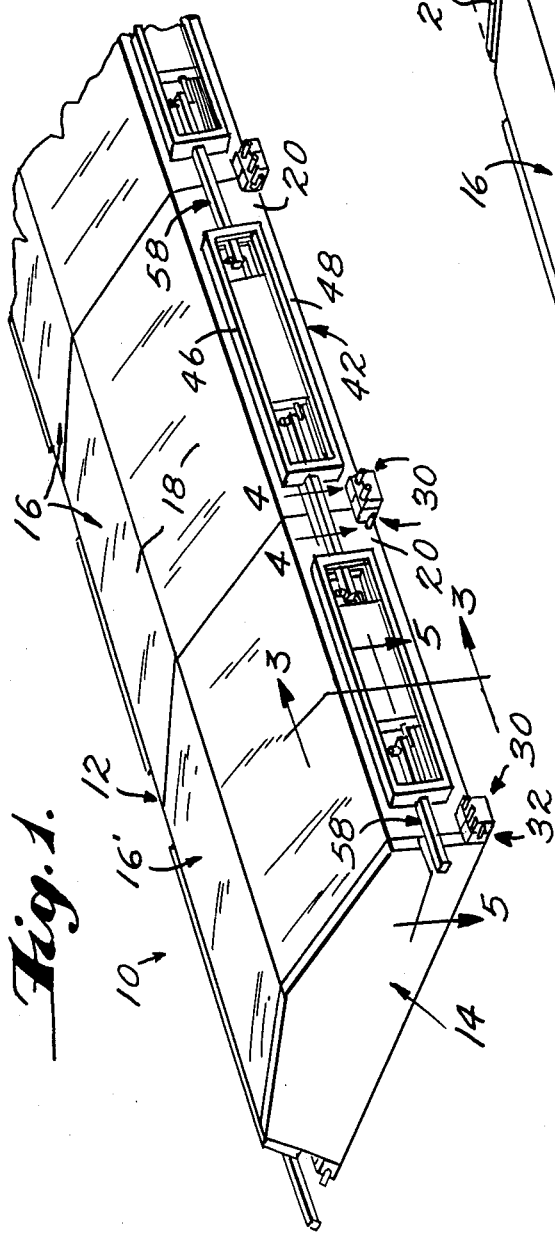
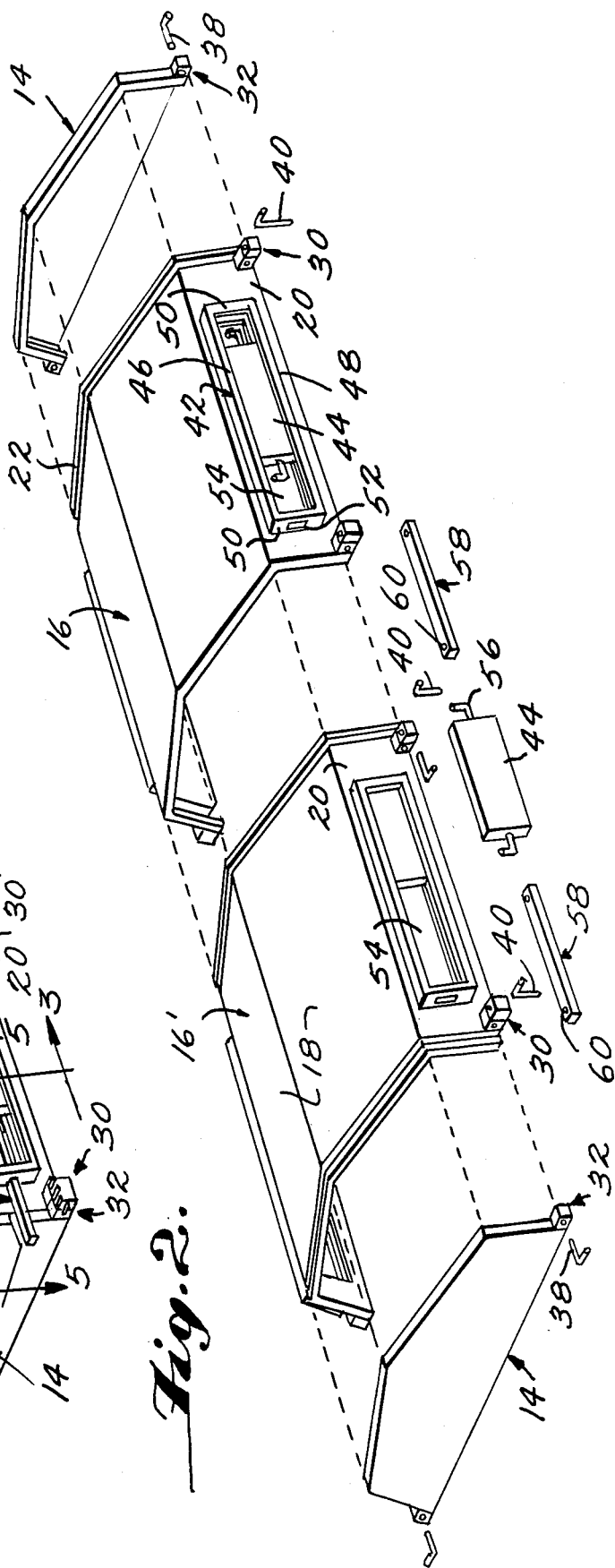

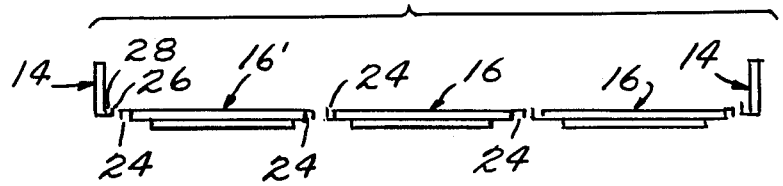
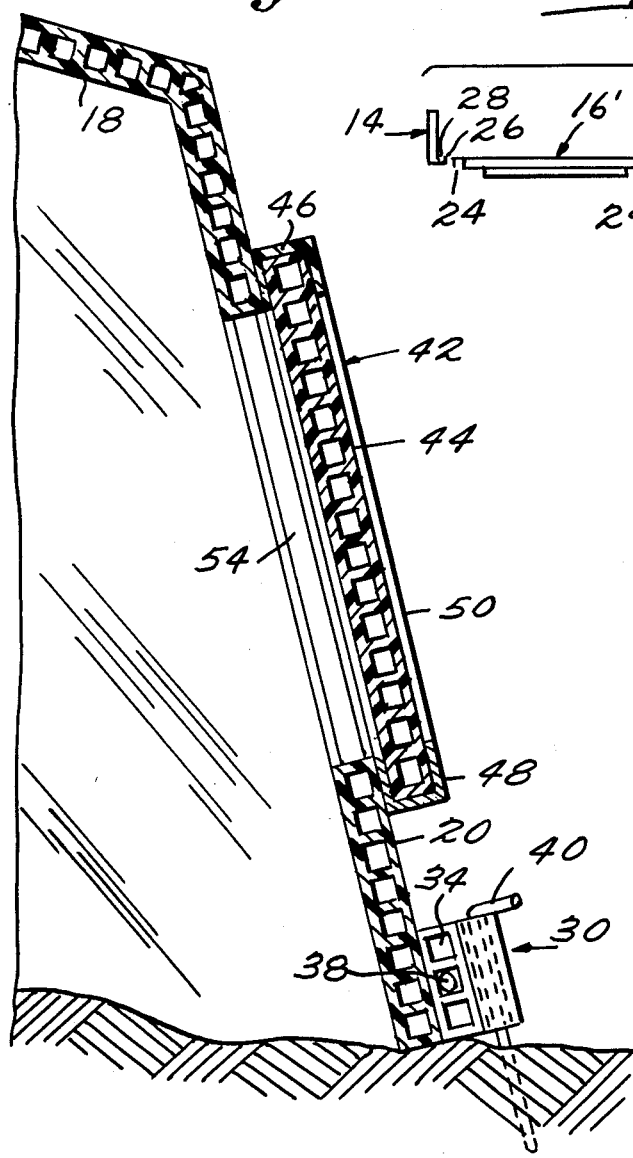
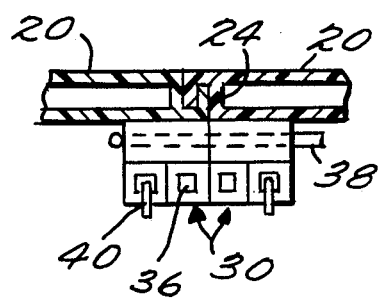
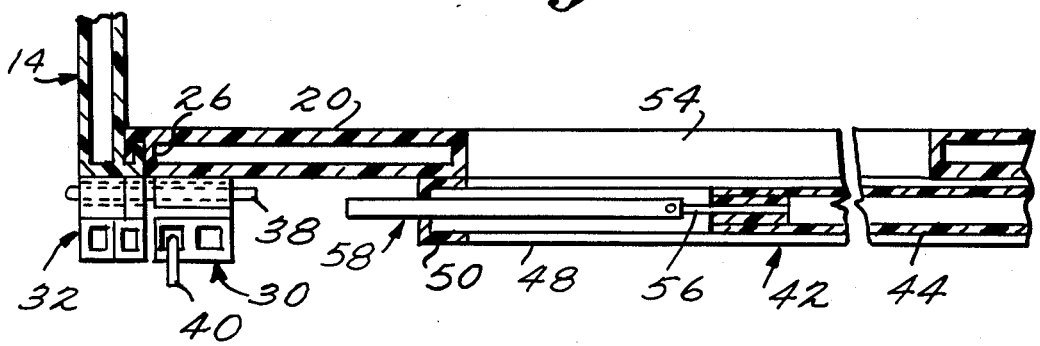

PORTABLE COLD FRAME

BACKGROUND OF THE INVENTION

The invention is broadly concerned with promoting the growth of plants, and in particular vegetables, under conditions which would normally be considered too severe for proper growth.

Adverse conditions could entail many factors including excess moisture or lack of moisture, wind, and most significantly, cold.

Various means have been proposed to accommodate such conditions from elaborate greenhouses covering multiple acres to cold frames for individual or small groupings of plants.

The use of cold frames is a particularly desirable way to protect outdoor plants from severe ambient conditions. However, it is often difficult to accommodate such frames to differing circumstances as encountered in the field growing of either individual plants by the homeowner or rows of plants by those interested in more extensive plantings. Problems arise both in the actual provision of cold frames in varying sizes, and in controlling such vent means as may be provided, particularly wherein extended length or multiple cold frames are provided.

SUMMARY OF THE INVENTION

The cold frame of the invention is adapted to enclosed field-growing crops, sealing directly to the earth in surrounding relation thereto for retention of heat and moisture to encourage growth.

The cold frame is of a multiple-section construction wherein the length of the frame can be varied through the selective addition and/or removal of sections for an accommodation of crop rows of substantially any reasonable length. Each of the sections is both self-supporting and individually anchored to the ground for a stable construction regardless of the length of the frame. The cold frame of the invention also incorporates a ventilation system comprising vents associated with each section and control components for interconnection and simultaneous actuation of the vents throughout the length of the constructed cold frame.

Basically, each section includes opposed sloping roof panels and generally vertical side wall panels. The two opposed ends of each of the sections include peripheral lips or channels adapted to interfit with similar channels on adjacent sections to define water-excluding joinders. The opposed ends of the assembled sections are closed by end walls, each with a peripheral lip or channel interlocking with the corresponding end of the endmost section. The sections, other than for a first starter unit or section include an inwardly directed channel at one end thereof and a corresponding outwardly directed channel at the second end for an internesting of the corresponding edges of adjacent sections. The starter unit includes an outwardly directed peripheral channel at both ends thereof whereby each end of the frame, whether formed only of the starter unit or of multiple sections extending from the starter unit, terminates at the opposite ends in outwardly directed channels which are received within inwardly directed peripheral channels on the end walls, thus maintaining a water-draining channel configuration at each edge joinder along the frame.

Each of the sections includes a vent with sliding closure panel along each side wall thereof. Assuming multiple sections, the vents along each side include connector means for simultaneous manipulation of the vent panels along the one side of the frame from one end of the frame. In addition, each of the sections, as well as the two end walls, include position blocks for the accommodation of both alignment bars and anchor spikes for an effective stabilization of both the entire frame and the individual units.

Additional details of construction and manner of use, and the objects and advantages residing therein, will become apparent from the more complete description of the invention following hereinafter.

BRIEF DESCRIPTION OF THE DRAWINGS

FIG. 1 is a partial perspective view of a cold frame constructed in accord with the present invention;

FIG. 2 is an exploded perspective view of the cold frame;

FIG. 3 is an enlarged cross-sectional view taken substantially on a plane passing along line 3—3 in FIG. 1;

FIG. 4 is an enlarged cross-sectional detail taken substantially on a plane passing along line 4—4 in FIG. 1;

FIG. 5 is an enlarged partial cross-sectional detail taken substantially on a plane passing along line 5—5 in FIG. 1; and FIG. 6 is an exploded schematic cross-sectional view longitudinally through a portion of the cold frame and illustrating the relationship of the end joinder constructions.

DESCRIPTION OF PREFERRED EMBODIMENT

Referring now more specifically to the drawings, a cold frame 10 in accord with the present invention basically includes a central housing 12 and opposed end walls 14.

The housing 12, depending upon the length of the crop row to be accommodated, comprises at least one, and normally multiple sections 16. In each instance, one of the sections, whether used alone or in combination with other sections 16 constitutes a starter unit or section 16'. Each of the sections 16 and 16' comprise a roof defined by a pair of roof panels 18 sloping downward and outward from a central peak, and side walls 20 sealed to and depending from the outer edges of the roof panels 18. The side walls 20 preferably incline slightly outward from the vertical to allow stacking of the sections for storage purposes, and to also facilitate edge joinder of adjacent sections as shall be explained subsequently. The inclined walls additionally provide for a wider more stable base and increased exposure to external sunlight. As noted in the various cross-sectional details, the roof panels 18 and the side walls 20 are preferably double-wall hollow-core transparent or translucent synthetic resin panels which provide both superior light transmission and thermal insulation, particularly desired for the retention of ground heat to preclude freezing.

Each of the sections 16 and 16' include opposed open ends, the full lengths of which include laterally turned edge flanges 22 defined as a continuation of one of the walls of the corresponding double-wall panels which comprise the roof panels 18 and side walls 20 of each section. Each of these lateral turned edge flanges define, with the adjacent section panels, a full length laterally directed channel 24. The two end channels 24 on the starter unit or section 16' are both outwardly directed relative to the interior of the cold frame. On each of the remaining sections 16, the end channel 24 on the end of the section closest to the starter unit 16' is inwardly directed while the end channel 24 on the opposite end of the section 16 is outwardly directed in the manner of both channels on the starter section 16'. Thus, the sections are simply and effectively edge joined by first positioning the starter section 16' and then introducing the inwardly directed end channel of each subsequent section 16, through a downward vertical sliding movement thereof, into the outwardly directed channel of the previously positioned section, either 16' or 16. The last section 16 will terminate in an outer end with an outwardly directed end channel regardless of the number of sections used. The provision of the starter section 16' with two outwardly directed end channels allows for this relationship whether using one or multiple sections.

Each of the formed end channels is of a depth slightly less than the thickness of the double-walled panels to provide a smooth joinder between adjacent sections with the internesting channels complimenting each other to provide a section-stabilizing interlock. Further, it would be appreciated that at each end joinder, the outwardly directed end channel thereat provides an effective moisture seal for a positive run-off of rain, particularly desirable under freezing conditions.

The end panels or walls 14 are similarly constructed of transparent or translucent hollow-core insulating panels configured to close the opposed open ends of the housing 12 defined by the sections 16 and 16'. The peripheral edge of each of the end panels 14, other than for the horizontal ground engaging edge, includes an inwardly directed edge flange 26 spaced from the inner surface of the end wall 14 to define an inwardly directed channel 28 which compliments and nestably engages within the outwardly directed channel 24 of the adjacent endmost section 16 or 16'. The end panels 14 will mount on the corresponding endmost sections after a positioning of the sections. As will be appreciated, if a minimum length cold frame 10 is to be provided utilizing only a single section, for example in a home garden, only the starter unit or section 16' will be used with an end wall mounted on and enclosing each of the opposed ends of the section 16'.

Alternatively, if multiple sections are used, the sections will be edge joined and the end walls mounted to provide the end closures.

In order to ensure longitudinal alignment of the sections and preclude lateral shifting therebetween, each of the sections, at the lower edges of the side walls 20 thereof adjacent the opposed ends, is provided with a positioning block 30. Similar blocks 32 are provided on the opposed edges of each end wall 14 adjacent the base thereof. Each of the positioning blocks 30 and 32 includes one or more horizontal alignment bores 34 therethrough and, immediately outward of the horizontal bores 34, one or more generally vertical anchor bores 36. These anchor bores 36 may, as noted in FIG. 3, follow the inclination of the section side wall 20 to which the corresponding block 30 is mounted.

Upon an engagement of adjacent sections, or the endmost sections and the end walls 14, and an alignment of the alignment bores 30 of the now-adjacent positioning blocks 30 or 32, elongate alignment pins 38 are extended through the aligned bores 34 in each pair of positioning blocks, note in particular FIGS. 3, 4 and 5. Thus lateral or vertical shifting of adjacent sections relative to each other or to the end walls is effectively prevented.

In order to further stabilize the cold frame 10, and anchor the frame to the ground, elongate anchor spikes or stakes 40 are inserted vertically through the anchor bores 36 and driven an appropriate distance into the ground. The slight divergent direction of the anchor spikes 40, as noted in FIG. 3, enhances the effectiveness of the anchors against any tendency for the cold frame to lift, for example under high wind conditions. As suggested in the drawing, both the alignment pins 38 and the anchor spikes 30 include laterally directed or enlarged ends for ease of insertion and removal.

Each of the housing sections 16 and 16' includes a pair of vents 42 provided longitudinally along the opposed side walls 20. Each vent includes a longitudinally sliding closure or closure panel 44 slidably received between and retained by upper and lower channel-shaped rails 46 and 48. Sliding travel of the vent closure 44 is limited, and the opposed ends of the rails 46 and 48 connected by vertical end members or posts 50, each of which includes a vertical access slot 52 centrally therein.

Each side wall 20, between the corresponding elongate slide rails 46 and 48, has an opening 54 defined therethrough and extending for approximately one-half the length of the vent 42. The vent closure 44, in turn, is of a length substantially equal to or slightly greater than the opening 54 whereby, through a longitudinal manipulation of the closure 44, the vent can be opened or closed, either fully or partially. Actual manipulation of the individual vent closures 44 is facilitated by hook-shaped handles 56 fixed to and extending centrally from the opposed vertical edges of the closure 44.

When multiple housing sections are utilized, it is particularly desirable that the aligned vents along each or either side of the cold frame 10 be simultaneously manipulated, preferably from one end of the frame. This becomes more important as the number of sections used and the length of the frame increases to equalize ventilation along the entire length of the frame and avoid the necessity for individual handling and adjusting each vent closure. Accordingly, elongate rigid connector bars 58 are interconnected between the hook handles 56 on aligned vent closures 44 of adjacent sections. The connector bars, in their simplest form, will include vertical apertures 60 through the end portions thereof which are received over the upwardly directed outer ends of the hook handles 56. Each bar 58 will be gravity-maintained on the hook handles 56 for a positive engagement therewith, while at the same time being easily disengaged therefrom for disassembly of the cold frame. The connector bars 58 are freely received through the vertical slots 52 of the end posts 50, the slots 52 being of sufficient height to also accommodate the hook handles 56 should this be necessary at the opposed extreme positions of the closures 44. It will be appreciated that the connectors 58 are of sufficient rigidity to effect both pulling and pushing of the vent closures with the entire ganged system of closures along each side of the cold frame having sufficient structural stability and integrity to accommodate cold frames of substantial length and multiple sections. As desired, and in order to provide a convenient handle for the ganged vents along one side of the frame, an endmost one of the vents can include a connector bar attached thereto and extending beyond the corresponding end wall 14. This is suggested in FIG. 1.

The cold frame 10 of the invention, consisting of multiple interengageable sections, can easily be accommodated to a variety of different growing situations, from a small home garden wherein one section would suffice, to a commercial growing situation wherein each cold frame will consist of multiple joined sections. In addition, the relationship of the components of the cold frame allow for a simple expansion or contraction of the frame length as desired in accord with changing conditions.

While not limited thereto, two sizes of cold frame sections are presently contemplated, 32"×48" (ten square feet) or 56" 48" (18.66 square feet). The roof panels 18 will preferably incline at approximately 20° to the horizontal, with the sidewalls 20 depending to define an internal angle with the ground of approximately 68°. The angled side walls and the low profile of the assembled cold frame provide an effective wind resistant structure, particularly when combined with the angled insertion of the ground anchors.

I claim:

1. A cold frame comprising a central longitudinally extended housing including at least one section with an outside surface, a roof and opposed side walls, said housing terminating in opposed open ends, an end wall removably closing each of said ends, each open end being defined by a laterally directed edge flange forming an edge channel opening outward relative to the housing, each end wall including an inwardly directed edge flange received within the outwardly opening edge channel of the adjacent housing end, said housing having multiple sections longitudinally joined with the endmost sections defining the opposed open ends of said housing, each of said sections having opposed section ends with a laterally directed edge channel along each section end, the edge channels of adjacent sections internesting to form a joinder therebetween, and at least two mating positioning blocks mounted on the outside surface of each section side wall adjacent the opposed section ends, said positioning blocks including longitudinal alignment bores therethrough which longitudinally align upon a longitudinal joining of said sections for mating said at least two position blocks, and said positioning blocks having alignment pins receivable through the aligned bores of said positioning blocks on adjacent sections to maintain a longitudinal alignment between the attached sections.

2. The cold frame of claim 1 wherein both edge channels on one of said endmost sections are outwardly opening, the edge channels on each of the remaining sections comprising one outwardly opening channel and one inwardly opening channel.

3. The cold frame of claim 2 including a vent on each section, each vent including a movable closure for selectively opening and closing the vent, and connector means connecting the closures of the joined sections for simultaneous movement of the closures.

4. The cold frame of claim 3 wherein each closure is slidably mounted within upper and lower longitudinally extending rails fixed to the corresponding section, said connector means comprising elongate rigid rods releasably engageable with and between the closures of adjacent sections.

5. The cold frame of claim 4 including positioning blocks on each section side wall adjacent the opposed section ends, said positioning blocks including longitudinal alignment bores therethrough which longitudinally align upon a longitudinal joining of said sections, and alignment pins receivable through the aligned bores of positioning blocks on adjacent sections to maintain a longitudinal alignment between the sections.

6. The cold frame of claim 5 wherein said positioning blocks including generally vertical anchor bores therethrough, and anchor spikes receivably through said anchor bores for anchoring engagement with the ground.

7. The cold frame of claim 5 wherein each end wall has positioning blocks thereon, the end wall positioning blocks having horizontal alignment bores therethrough alignable with the alignment bores of the positioning blocks on the adjacent endmost sections.

8. The cold frame of claim 7 wherein the end wall positioning blocks include generally vertical anchor bores for the extension of anchor spikes through.

9. The cold frame of claim 1 wherein said positioning blocks include generally vertical anchor bores therethrough, and anchor spikes receivable through said anchor bores for anchoring engagement with the ground.

10. In a portable cold frame, multiple housing sections, each section including a roof with a pair of opposed side walls, said sections having opposed open ends, means for joining said sections end-to end to define a continuous housing having adjacent sidewalls, each section including a vent in each side wall thereof with a sliding closure therefor, and connector means for rigidly interconnecting the closures between common side walls of joined sections for simultaneous operation of the connected closures of said adjacent sidewalls, the means for joining said sections end-to-end having laterally directed edge channels on said section ends for nesting engagement of the edge channels of adjacently positioned sections, positioning blocks mounted on each section having horizontal alignment bores through each block mounted on each section adjacent the ends thereof, and alignment pins receivable through bores of adjacently positioned sections to preclude lateral shifting.

11. The portable cold frame of claim 10 including generally vertical anchor bores defined on each section, and anchor spikes receivable through said anchor bores.

12. The portable cold frame of claim 11 include a pair of end wall for closing the opposed ends of a housing formed by joined sections.

* * * * *